US011509005B2

(12) United States Patent
Kasai et al.

(10) Patent No.: US 11,509,005 B2
(45) Date of Patent: Nov. 22, 2022

(54) BATTERY PACK INCLUDING SEPARATOR BETWEEN SECONDARY BATTERIES

(71) Applicant: KABUSHIKI KAISHA TOSHIBA, Tokyo (JP)

(72) Inventors: Masakatsu Kasai, Tokyo (JP); Norio Shimizu, Osaka (JP); Nagaaki Muro, Kanagawa (JP); Mitsuhiro Hoshino, Tokyo (JP); Kenji Shigehisa, Tokyo (JP); Takashi Muto, Tokyo (JP); Tomoyoshi Furusawa, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 62 days.

(21) Appl. No.: 16/979,074

(22) PCT Filed: Mar. 9, 2018

(86) PCT No.: PCT/JP2018/009212
§ 371 (c)(1),
(2) Date: Sep. 8, 2020

(87) PCT Pub. No.: WO2019/171575
PCT Pub. Date: Sep. 12, 2019

(65) Prior Publication Data
US 2021/0367290 A1 Nov. 25, 2021

(51) Int. Cl.
*H01M 10/6557* (2014.01)
*H01M 10/613* (2014.01)
(Continued)

(52) U.S. Cl.
CPC ..... *H01M 10/6557* (2015.04); *H01M 10/613* (2015.04); *H01M 10/647* (2015.04); *H01M 50/209* (2021.01); *H01M 50/463* (2021.01)

(58) Field of Classification Search
CPC .......... H01M 10/6557; H01M 10/613; H01M 10/647; H01M 50/209; H01M 50/463
See application file for complete search history.

(56) References Cited

U.S. PATENT DOCUMENTS

2006/0049799 A1 3/2006 Hamada et al.
2008/0299449 A1* 12/2008 Yun ..................... H01M 10/613
429/120
(Continued)

FOREIGN PATENT DOCUMENTS

JP 6-68887 A 3/1994
JP 2000-182631 A 6/2000
(Continued)

OTHER PUBLICATIONS

International Search Report dated Apr. 3, 2018 in PCT/JP2018/009212 filed Mar. 9, 2018, 2 pages.

*Primary Examiner* — Jimmy Vo
(74) *Attorney, Agent, or Firm* — Oblon, McClelland, Maier & Neustadt, L.L.P.

(57) ABSTRACT

A battery includes a plurality of secondary batteries, a casing including a lower case and an upper case, and a plurality of separators interposed between corresponding secondary batteries. Each separator includes a first stopper in a lower part, a second stopper in an upper part, and a cooling passage between the secondary batteries and between the first stopper and the second stopper. The casing includes a face opposing the lateral faces of the secondary battery and including an opening opposing the cooling passage.

8 Claims, 17 Drawing Sheets

(51) Int. Cl.
*H01M 10/647* (2014.01)
*H01M 50/209* (2021.01)
*H01M 50/463* (2021.01)

(56) References Cited

U.S. PATENT DOCUMENTS

| | | | |
|---|---|---|---|
| 2011/0104548 A1* | 5/2011 | Saito | H01M 10/6566 429/120 |
| 2012/0312701 A1 | 12/2012 | Greaves et al. | |
| 2013/0183571 A1* | 7/2013 | Miyazaki | H01M 10/647 429/156 |
| 2013/0244089 A1 | 9/2013 | Shimizu et al. | |
| 2014/0120400 A1 | 5/2014 | Yoshioka et al. | |

FOREIGN PATENT DOCUMENTS

| | | |
|---|---|---|
| JP | 2006-73461 A | 3/2006 |
| JP | 2013-520620 A | 6/2013 |
| JP | 2013-191440 A | 9/2013 |
| JP | 2017-50164 A | 3/2017 |
| WF | WO 2012/173269 A1 | 12/2012 |
| WO | WO 2013/084756 A1 | 6/2013 |

* cited by examiner

BATTERY PACK INCLUDING SEPARATOR BETWEEN SECONDARY BATTERIES

CROSS-REFERENCE TO RELATED APPLICATIONS

This application is a national stage application of International Application No. PCT/JP2018/009212, filed Mar. 9, 2018, which designates the United States, incorporated herein by reference.

TECHNICAL FIELD

Embodiments described herein relate generally to a battery pack.

BACKGROUND ART

In recent years, battery packs including a set of secondary batteries have been widely used for a power supply for use in vehicles, electronics, or other industrial purposes.

Such a battery pack generates heat during charging and discharging, therefore, it is important to cool the secondary batteries in order to prevent the secondary batteries from degrading in performance. It is thus preferable to provide a battery pack that can efficiently cool secondary batteries.

DESCRIPTION OF EMBODIMENTS

Figure 1:
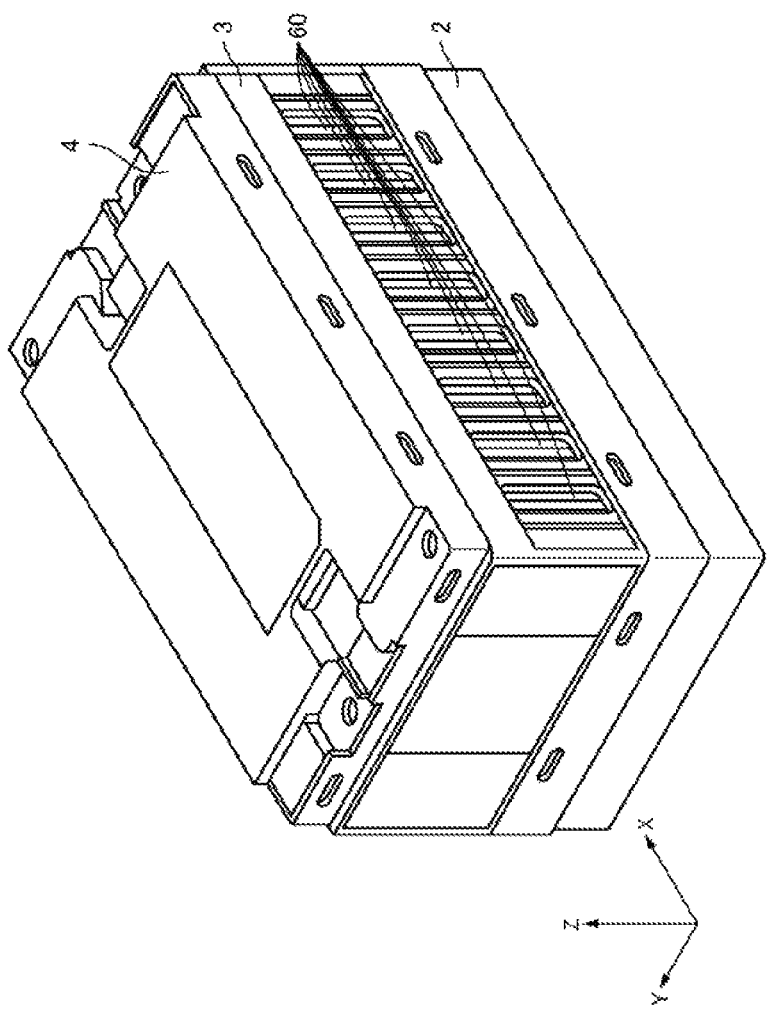
FIG. 1 is a perspective view of a battery pack according to an embodiment.

According to one embodiment, in general, a battery back includes a plurality of secondary batteries each including a terminal face provided with a positive electrode terminal and a negative electrode terminal, a pair of principal faces extending from a pair of long sides of the terminal face in a direction substantially orthogonal to the terminal face, a pair of lateral faces extending between the principal faces, and a bottom face opposite to the terminal face; a casing including a lower case having an opened top and a lower face opposing the bottom face, and an upper case having an opened bottom, and an upper face opposing the terminal face, the casing that houses the secondary batteries in a row in a first direction with a given secondary battery interval such that the principal faces oppose each other; and a plurality of separators placed between the corresponding secondary batteries. The lower case includes a plurality of first walls erected upward from the lower face to a given height to partition the corresponding secondary batteries. The upper case includes a plurality of second walls erected downward from the upper face to a given height to partition the corresponding secondary: batteries. The separators are disposed between the first walls and the second walls. The separators each include a first stopper in a lower part, a second stopper in an upper part, and a cooling passage between the secondary batteries and between the first stopper and the second stopper. The first stopper and the second stopper both have a thickness in the first direction substantially equal to the secondary battery interval. The casing has a face opposing the lateral faces and provided with an opening opposing the cooling passage.

Hereinafter, embodiments will be described with reference to the accompanying drawings. In the drawings, directions (X, Y, and Z directions) are defined for the sake of convenience. The X, Y, and Z directions are orthogonal to one another.

Figure 2:
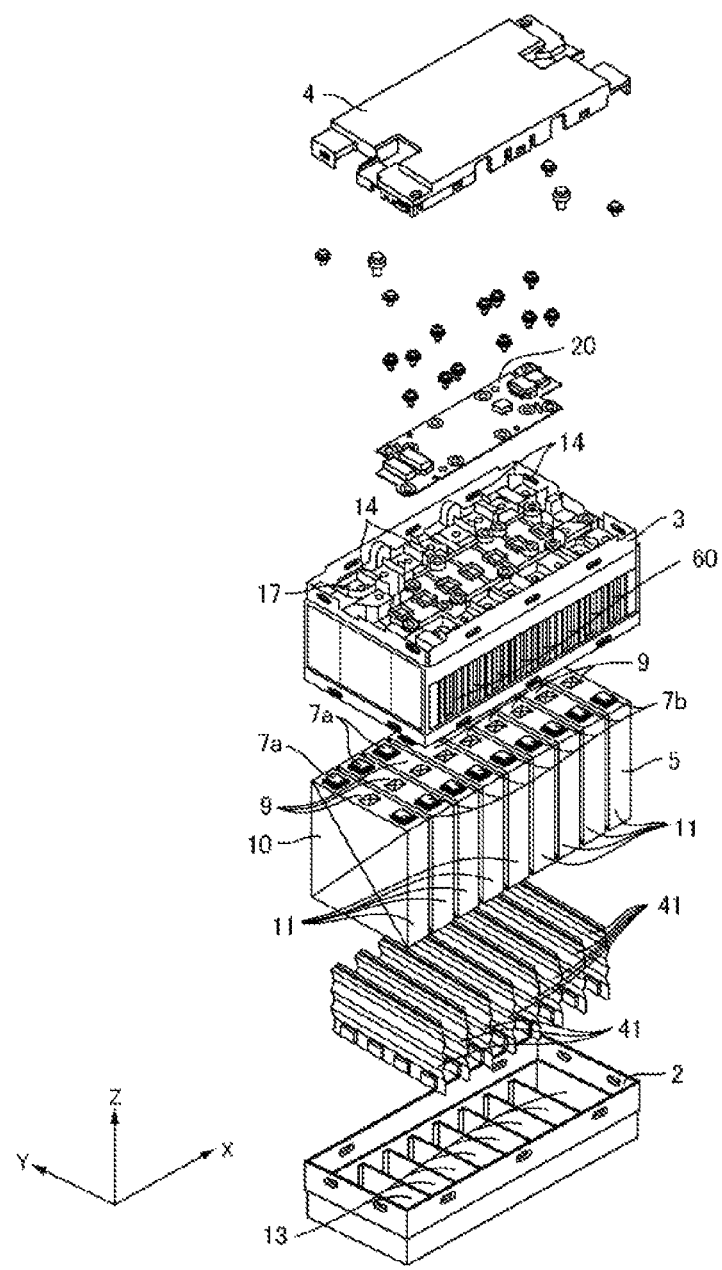
FIG. 2 is an exploded perspective view of the battery pack according to the embodiment.

FIG. 1 is a perspective view of a battery pack 1 according to an embodiment. FIG. 2 is an exploded perspective view of the battery pack 1 according to the embodiment. The battery pack 1 includes a rectangular box-shaped lower case 2 with a top opened, and a rectangular box-shaped upper case 3 with a bottom opened, connected to the opened top of the lower case 2, and is also provided with a rectangular box-shaped lid 4 with a bottom opened, to cover the top part of the upper case 3.

The parts and components of the lower case 2, the upper case 3, and the lid 4 are made of an insulating synthetic resin material (e.g., modified PPE (polyphenylene ether), and PFA (perfluoroalkoxy alkane, tetrafluoroethylene-perfluoroalkyl vinyl ether copolymer)). The synthetic resin material can be thermoplastic resins. Examples of the thermoplastic resins include crystalline resins such as olefin resins such as PE, PP and PMP, polyester resins such as PET, PBT and PEN, POM resins, polyamide resins such as PA6, PA66 and PA12, PPS resins, and LCP resins, and alloy resins thereof, or non-crystalline resins such as PS, PC, PC/ABS, ABS, AS, modified PPE, PES, PEI, and PSF, and alloy resins thereof.

Figure 3:
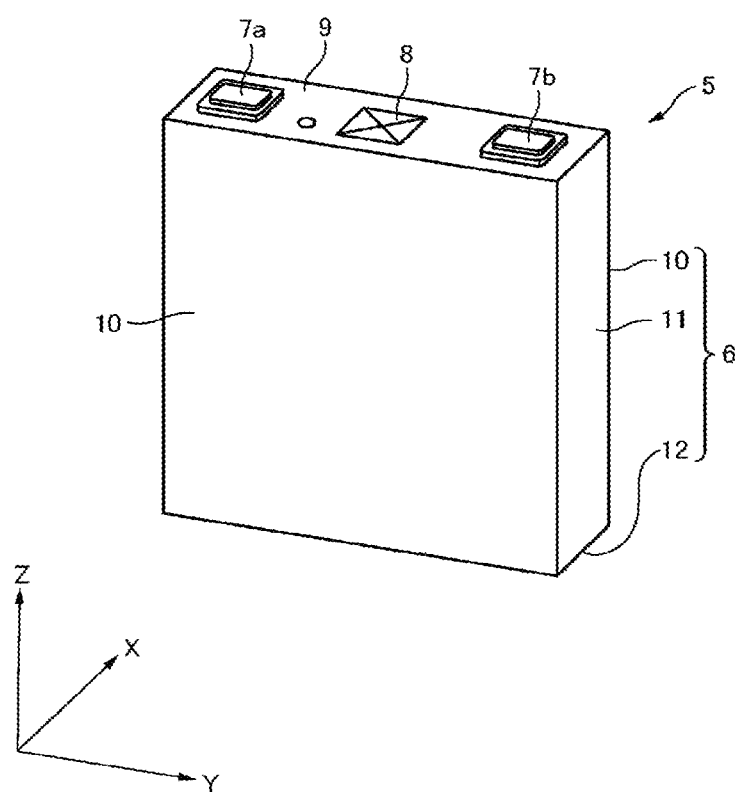
FIG. 3 is a perspective view of a secondary battery according to the embodiment.

A plurality of secondary batteries 5 as illustrated in FIG. 3 is housed in a casing including the lower case 2, the upper case 3, and the lid 4. The secondary batteries 5 are, for example, nonaqueous electrolyte secondary batteries such as a lithium-ion battery, and include an exterior container 6 of a flat or substantially rectangular-parallelepiped shape formed of, for example, aluminum or aluminum alloy, and an electrode (not illustrated) housed in the exterior container 6 together with a nonaqueous electrolytic solution.

A terminal face 9 of the top of the exterior container is provided with two types of terminals, i.e., a positive electrode 7a and a negative electrode 7b, at both ends in a longitudinal direction Y. The positive-electrode terminal 7a and the negative-electrode terminal 7b are electrically connected to an electrode. The secondary battery cell 5 may be provided with a gas exhaust valve 8 that discharges gas if internally occurs, and a liquid inlet from which the nonaqueous electrolytic solution is injected into the secondary battery 5.

In addition to the terminal face 9, the exterior container 6 includes a pair of principal faces 10 extending in a direction (Z direction) substantially orthogonal to the terminal face 9 from a pair of long sides of the terminal face 9, a pair of lateral faces 11 extending between the principal faces 10, and a bottom face 12 opposite to the terminal face 9.

Figure 4:
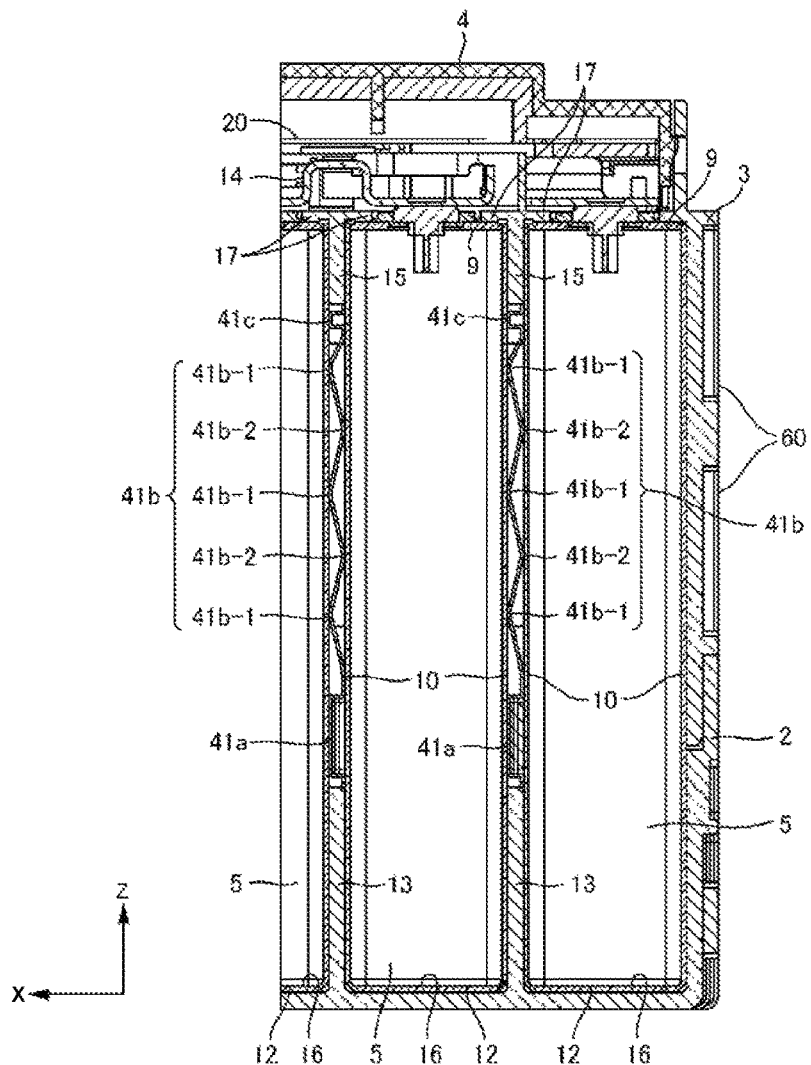
FIG. 4 is an enlarged cross-sectional view of the battery pack according to the embodiment.

The lower case 2 and the upper case 3 are described with reference to FIGS. 1 and 2, and FIG. 4 depicting a partially enlarged cross-section of the battery pack 1 along an XZ plane. The lower case 2 has a lower face 16 opposing the bottom faces 12 of the secondary batteries 5. The upper case 3 has an upper face 17 opposing the terminal faces 9 of the secondary batteries 5.

The secondary batteries 5 are housed therein in a row in the X direction (a first direction) with a given interval (intervals of secondary batteries) such that the principal faces 10 of the secondary batteries 5 oppose each other.

The lower case 2 has a plurality of first walls 13 erected upward (upward in the Z direction) from the lower face 16 to a given height so as to partition the corresponding secondary batteries 5.

The upper case 3 has a plurality of second walls 15 erected downward (downward in the Z direction) from the upper face 17 to a given height so as to partition the corresponding secondary batteries 5.

According to the present embodiment nine secondary batteries 5 are connected in series by way of example. The secondary batteries 5 are arrayed with the principal faces 10 opposing each other, forming a battery cell group. Part of the upper case 3 corresponding to the positive electrode terminals 7a and the negative electrode terminals 7b of the secondary batteries 5 are opened so as to connect the positive electrode terminals 7a and the negative electrode terminals 7b to busbars 14 by, for example, welding.

The busbars 14 are set on part of the upper face 17 of the upper case 3 not opposing the terminal faces 9 of the secondary batteries 5. Each busbar 14 electrically connects the positive electrode terminal 7a and the negative electrode terminal 7b of the adjacent secondary batteries 5. The busbars 14 are formed by bending a metal plate made of, for example, conductive aluminum or brass. Each busbar 14 may also include a voltage detector (not illustrated) to be electrically connected to a substrate 20 described later.

Figure 5:
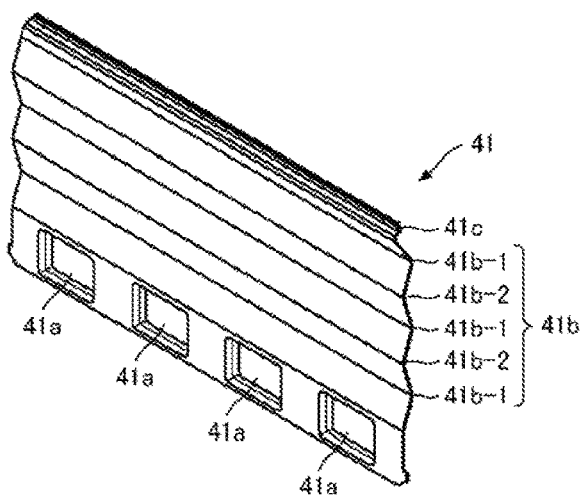
FIG. 5 is a perspective view of a separator according to the embodiment.
Figure 6:
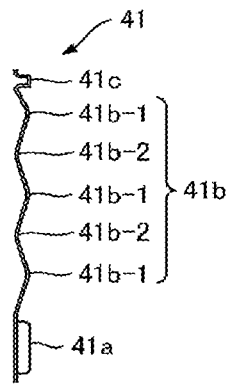
FIG. 6 is a cross-sectional view of the separator according to the embodiment.

As illustrated in FIG. 4, a plurality of separators 41 is placed between the corresponding secondary batteries 5. The separators 41 will be described below in detail with reference FIGS. 4, 5, and 6. FIG. 5 is a perspective view of the separator 41, and FIG. 6 is a cross-sectional view of the separator 41.

The separators 41 are made of an insulating synthetic resin material (e.g., modified PPE (polyphenylene ether)). The synthetic resin material can be thermoplastic resins. Examples of the thermoplastic resins include PE, polyester resins such as PET, PBT and PEN, or non-crystalline resins such as PS, PC, PC/ABS, ABS, AS, modified PPE, PES, PEI and PSF, and alloy resins thereof.

Each separator 41 includes first stoppers 41a, a cooling passage 41b, and a second stopper 41c. The first stoppers 41a are located at one Z-axial end of the separator 41. The second stopper 41c is located at the other Z-axial end of the separator 41. The cooling passage 41b extends between the first stoppers 41a and the second stopper 41c.

The first stoppers 41a are in the form of protrusions having a substantially rectangular-parallelepiped shape and a substantially square U-shaped cross section, and oppose the first walls 13 erected from the lower case 2. The X-axial width of each protrusion is substantially equal to the given interval (interval of secondary batteries) between the secondary batteries 5. The first stoppers 41a are spaced apart from each other in a direction (Y-axis direction) orthogonal to the thickness (X-axis direction) of the separator 41.

Meanwhile, the second stopper 41c is in the form of a groove continuously extending in the Y-axis direction, having a substantially square U-shaped cross section, and opposes the second walls 15 erected from the upper case 3. The X-axial width of the groove is substantially equal to the given interval (interval of secondary batteries) between the secondary batteries 5. The second stopper 41c extends in the direction (Y-axis direction) orthogonal to the thickness (X-axis direction) of the separator 41.

Preferably, the first stoppers 41a are longer in length than the second stopper 41c in the Z-axis direction.

According to the present embodiment, the cooling passage 41b of each separator 41 has a zigzag-shaped cross section structure so as to contact with multiple points of the secondary batteries 5 located at both sides of the separator 41. The cooling passage 41b extends in the direction (Y-axis direction) orthogonal to the thickness (X-axis direction) of the separator 41.

In other words, the cooling passage 41b is provided with first protrusions 41b-1 and second protrusions 41b-2. The first protrusions 41b-1 protrude in the first direction from the center of the secondary battery interval to one of the two secondary batteries 5 adjacent to the cooling passage 41b to abut against this secondary battery 5 and form a gap with the other of the two adjacent secondary batteries 5. The second protrusions 41b-2 protrude in the first direction from the center of the secondary battery interval to the other of the secondary batteries 5 so as to abut against this secondary battery 5 and form a gap with the one of the secondary batteries 5. The first protrusions 41b-1 and the second protrusions 41b-2 are alternately, repeatedly, and continuously disposed in a connecting direction (Z-axis direction) of the first stoppers 41a and the second stopper 41c.

Returning to FIG. 4, the battery pack 1 including the separators 41 will be described. As described above, the separators 41 are each placed between the adjacent secondary batteries 5, opposing the principal faces 10 of the secondary batteries 5. The separators 41 are disposed such that the first stoppers 41a are set on the top of the first walls 13 of the lower case 2 and the second stoppers 41c form the bottom of the second walls 15 of the upper case 3.

As illustrated in FIGS. 1 and 2, the lateral face (XZ lateral face) of the upper case 3 of the battery pack 1, opposing the lateral faces 11 of the secondary batteries 5, is provided with a plurality of openings 60. The openings 60 have a substantially rectangular cross section, and are connected to the intervals between the secondary batteries in which the separators 41 are located. That is, the openings 60 are spaced at given intervals as with the separators 41, to allow a coolant such as air to flow through the openings 60.

Owing to the separators 41, the battery pack 1 can insulate the adjacent secondary batteries 5 from each other and at the same time place the adjacent secondary batteries 5 with given spacing so that the coolant such as air can flow into the spacing.

Each separator 41 is also provided with the zigzag-shaped cooling passage 41b. Thus, the coolant can contact with not the principal face 10 of only one of the adjacent secondary batteries 5 but the principal faces 10 of both the secondary batteries 5. This allows the coolant to flow in relatively even contact with the adjacent secondary batteries 5 as compared with the coolant contacting with only one of the secondary batteries 5. Because of this, the secondary batteries 5 are unlikely to be cooled at different degrees, enabling decrease in temperature difference between the secondary batteries 5.

Moreover, each separator 41 includes the first stoppers 41a and the second stopper 41c. The X-axial width of the protrusion of the first stopper 41a and the X-axial width of the groove of the second stopper 41c are substantially equal to the secondary battery interval between the secondary batteries 5. This can prevent the separator 41 from entering the gap between the secondary battery 5 and the first wall 13 and between the secondary battery 5 and the second wall 15. In addition the separator 41 can be restricted from moving within the secondary battery interval.

Since the X-axial width of the protrusion of the first stopper 41a and the X-axial width of the groove of the second stopper 41c are substantially equal to the secondary battery interval between the secondary batteries 5, the coolant is unlikely to flow into the part including the first stoppers 41a and the second stopper 41c. Thus, the coolant flows into the cooling passage 41b in a concentrative manner.

The first stoppers 41a are longer in length than the second stopper 41c in the Z-axis direction, so that the cooling passage 41b is located closer to the terminal faces 9 of the secondary batteries 5 generating a larger amount of heat. Thus, a larger amount of coolant flows into this part closer to the terminal faces. Consequently, the secondary batteries 5 can be efficiently cooled.

First Modification

Hereinafter, a first modification will be described. Descriptions of the same elements and effects as those of the embodiment will be omitted as appropriate.

Figure 7:
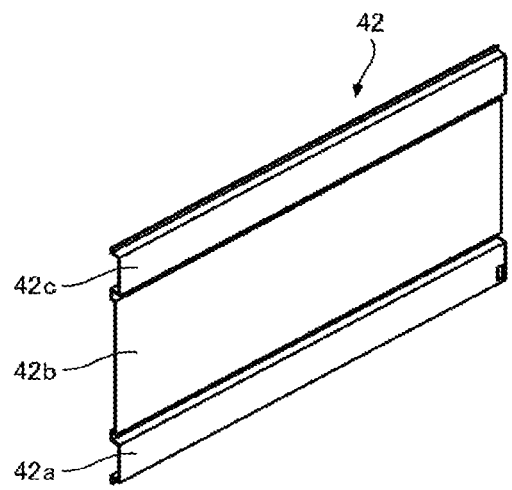
FIG. 7 is a perspective view of a separator according to a first modification.
Figure 8:
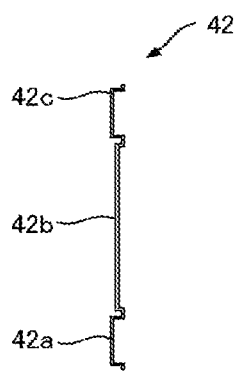
FIG. 8 is a cross-sectional view of the separator according to the first modification.
Figure 9:
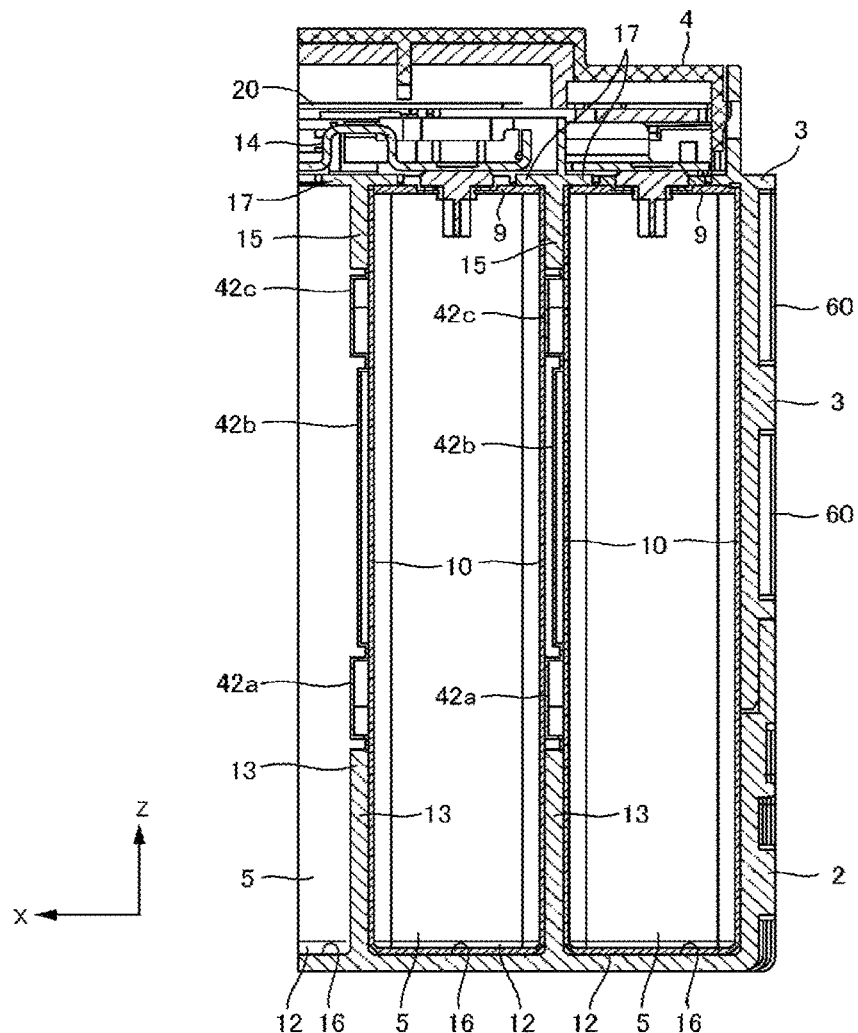
FIG. 9 is an enlarged cross-sectional view of a battery pack according to the first modification.

FIG. 7 is a perspective view of a separator 42 according to the present modification. FIG. 8 is a cross-sectional view of the separator 42 according to the present modification. FIG. 9 is an enlarged cross-sectional view of the battery pack 1 including the separators 42 along an XZ plane.

As illustrated in FIGS. 7 to 9, the separator 42 of the first modification includes a first stopper 42a, a cooling passage 42b, and a second stopper 42c.

The first stopper 42a is located at one Z-axial end of the separator 42. The second stopper 42c is located at the other Z-axial end of the separator 42. The cooling passage 42b extends between the first stopper 42a and the second stopper 42c.

The first stopper 42a is in the form of a groove continuously extending in the Y-axis direction, having a substantially square U-shaped cross section, and opposes the first wall 13 erected from the lower case 2. The X-axial width of the groove is substantially equal to the given interval (secondary battery interval) between the secondary batteries 5. The first stopper 42a extends in a direction (Y-axis direction) orthogonal to the thickness (X-axis direction) of the separator 42.

The second stopper 42c is in the form of a groove extending continuously in the Y-axis direction, having a substantially square U-shaped cross section, and opposes the second wall 15 erected from the upper case 3. The X-axial width of the groove is substantially equal to the given interval (secondary battery interval) between the secondary batteries 5. The second stopper 42c extends in the direction (Y-axis direction) orthogonal to the thickness (X-axis direction) of the separator 42.

The first stopper 42a is preferably longer in length than the second stopper 42c in the Z-axis direction.

According to the present modification the cooling passage 42b of each separator 42 is planar, and is located at substantially a half of the first given interval between the secondary batteries 5 in the X-axis direction. In other words, the cooling passage 42b of the separator 42 is located in the center of the secondary battery interval in the first direction.

The battery pack 1 including such separators 42 can insulate the adjacent secondary batteries 5 from each other and at the same time place the adjacent secondary batteries 5 with given spacing so that the coolant such as air can flow into the spacing.

Further, each separator 42 includes the cooling passage 42b in the center of the secondary battery interval in the first direction. Thus, the coolant can contact both of the adjacent secondary batteries 5. This allows the coolant to flow in relatively even contact with the adjacent secondary batteries 5 as compared with the coolant contacting with only one of the secondary batteries 5. Because of this, the secondary batteries 5 are unlikely to be cooled at different degrees, enabling decrease in temperature difference between the secondary batteries 5.

Each separator 42 further includes the first stopper 42a and the second stopper 42c. The X-axial widths of the grooves of the first stopper 42a and the second stopper 42c are substantially equal to the secondary battery interval between the secondary batteries 5 in the X-axis direction. This can prevent the separator 42 from entering the gap between the secondary battery 5 and the first wall 13 and between the secondary battery 5 and the second wall 15. In addition the separator 42 can be restricted from moving within the first secondary battery interval.

Furthermore, it is difficult for the coolant to flow into the part including the first stopper 42a and the second stopper 42c. Thus, the coolant flows into the part provided with the cooling passage 42b. The first stopper 42a are longer in length than the second stopper 42c in the Z-axis direction, so that the cooling passage 42b is located closer to the terminal faces 9 of the secondary batteries 5 generating a larger amount of heat. Thus, a larger amount of coolant flows into this part closer to the terminal faces. Consequently, the secondary batteries 5 can be efficiently cooled.

Second Modification

Hereinafter, a second modification will be described. Descriptions of the same elements and effects as those of the embodiment will be omitted as appropriate.

Figure 10:
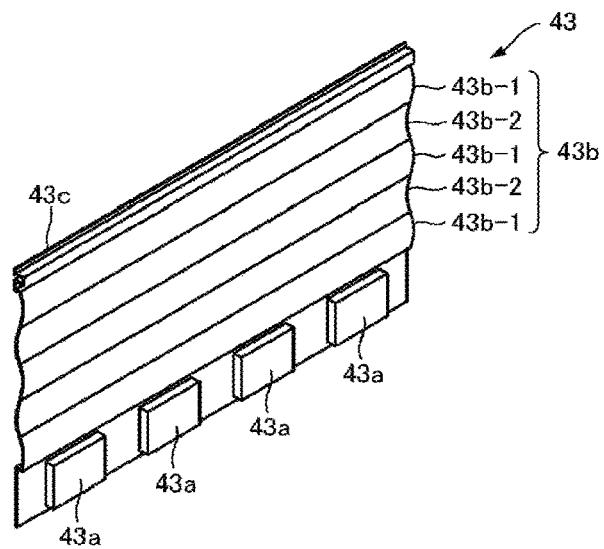
FIG. 10 is a perspective view of a separator according to a second modification.
Figure 11:
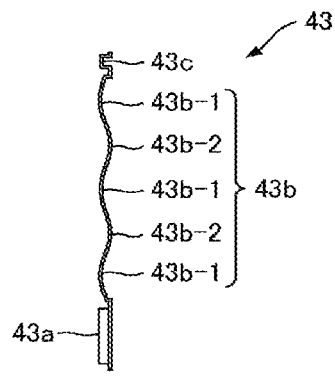
FIG. 11 is a cross-sectional view of the separator according to the second modification.
Figure 12:
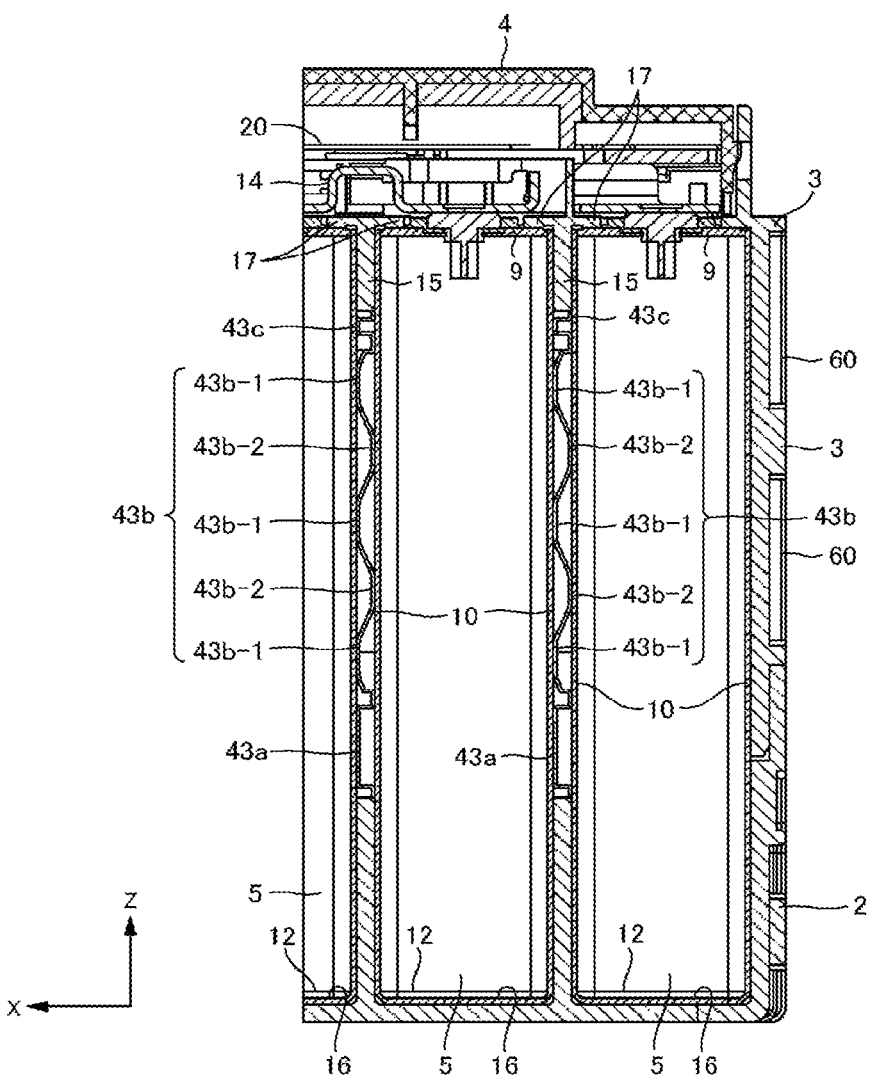
FIG. 12 is an enlarged cross-sectional view of a battery pack according to the second modification.

FIG. 10 is a perspective view of a separator 43 according to the second modification. FIG. 11 is a cross-sectional view of the separator 43 according to the second modification. FIG. 12 is an enlarged cross-sectional view of the battery pack 1 including the separators 43 along an XZ plane.

As illustrated in FIGS. 10 to 12, the separator 43 of the second modification includes first stoppers 43a, a cooling passage 43b, and a second stopper 43c.

The first stoppers 43a are located at one Z-axial end of the separator 43. The second stopper 43c is located at the other Z-axial end of the separator 43. The cooling passage 43b is located between the first stoppers 43a and the second stopper 43c.

The first stoppers 43a are in the form of protrusions of a substantially rectangular-parallelepiped shape, having substantially square U-shaped cross section, and oppose the first walls 13 erected from the lower case 2. The X-axial width of each protrusion is substantially equal to the given interval (secondary battery interval) between the secondary batteries 5. The first stoppers 43a are spaced apart from each other in a direction (Y-axis direction) orthogonal to the thickness (X-axis direction) of the separator 43.

The second stopper 43c is in the form of a groove continuously extending in the Y-axis direction, having a substantially square U-shaped cross section, and opposes the second wall 15 erected from the upper case 3. The X-axial width of the groove is substantially equal to the given interval (secondary battery interval) between the secondary batteries 5. The second stopper 43c extends in the direction (Y-axis direction) orthogonal to the thickness direction (X-axis direction) of the separator 43.

The first stoppers 43a are preferably longer in length than the second stopper 43c in the Z-axis direction.

The cooling passage 43b of each separator 43 according to the present embodiment has a waveform cross section structure so as to contact with multiple points of the secondary batteries 5 located at both sides of the separator 43. The cooling passage 43b extends in the direction (Y-axis direction) orthogonal to the thickness The cooling passage 43b of each separator 43 according to the present modification has a waveform cross section structure so as to contact with multiple points of the secondary batteries 5 located at both sides of the separator 43. The cooling passage 43b extends in the direction (Y-axis direction) orthogonal to the thickness (X-axis direction) of the separator 43.

In other words, the cooling passage 43b is provided with first protrusions 43b-1 and second protrusions 43b-2. The first protrusions 43b-1 protrude in the first direction from the center of the secondary battery interval to one of the two secondary batteries 5 adjacent to the cooling passage 43b, to abut against this secondary battery 5 and form a gap with the other of the two adjacent secondary batteries 5. The second protrusions 43b-2 protrude in the first direction from the center of the secondary battery interval to the other of the secondary batteries 5, to abut against this secondary battery 5 and form a gap with the one of the secondary batteries 5. The first protrusions 43b-1 and the second protrusions 43b-2 are alternately, repeatedly, and continuously disposed in a waveform in a direction perpendicular to the cooling passage.

The first stoppers 43a are preferably longer in length than the second stopper 43c in the Z-axis direction.

Owing to the separators 43, the battery pack 1 can insulate the adjacent secondary batteries 5 from each other and at the same time place the adjacent secondary batteries 5 with given spacing so that the coolant such as air can flow into the spacing.

Each separator 43 is also provided with the cooling passage 43b. Thus, the coolant can contact with not the principal face 10 of only one of the adjacent secondary batteries 5 but the principal faces 10 of both the secondary batteries 5. This allows the coolant to flow in relatively even contact with the adjacent secondary batteries 5 as compared with the coolant contacting with only one of the secondary batteries 5. Because of this, the secondary batteries 5 are unlikely to be cooled at different degrees, enabling decrease in temperature difference between the secondary batteries 5.

Moreover, each separator 43 includes the first stoppers 43a and the second stopper 43c. The X-axial width of each protrusion of the first stoppers 43a and the X-axial width of the groove of the second stopper 43c are substantially equal to the secondary battery interval between the secondary batteries 5. This can prevent the separator 43 from entering the gap between the secondary battery 5, and the first wall 13 and the second wall 15.

Further, it is difficult for the coolant to flow into the part including the first stoppers 43a and the second stoppers 43c. Thus, the coolant flows into the part including the cooling passage 43b. The first stoppers 43a are longer in length than the second stopper 43c in the Z-axis direction, so that the cooling passage 43b is located closer to the terminal faces 9 of the secondary batteries generating a larger amount of heat. That is, a larger amount of coolant can flow into the part closer to the terminal faces 9. Consequently, the secondary batteries 5 can be more efficiently cooled.

Further, the first stoppers 43a and the second stopper 43c are secured in the secondary battery interval between the adjacent secondary batteries 5. Thereby, the separator 43 can be restricted from moving within the first interval, and avoided from moving closer to one side of the secondary batteries 5 within the secondary battery interval. This enables the coolant to contact with the two secondary batteries 5 as evenly as possible, cooling the secondary batteries 5 as evenly as possible.

Third Modification

Hereinafter, a third modification will be described. Descriptions of the same elements and effects as those of the embodiment will be omitted as appropriate.

Figure 13:
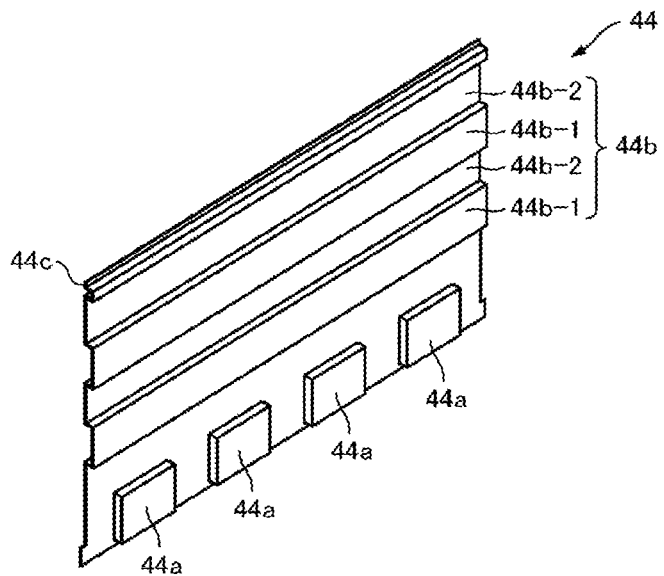
FIG. 13 is a perspective view of a separator according to a third modification.
Figure 14:
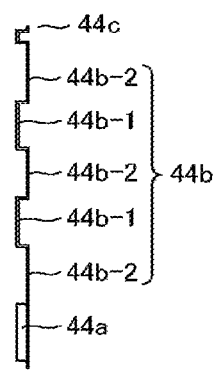
FIG. 14 is a cross-sectional view of the separator according to the third modification.
Figure 15:
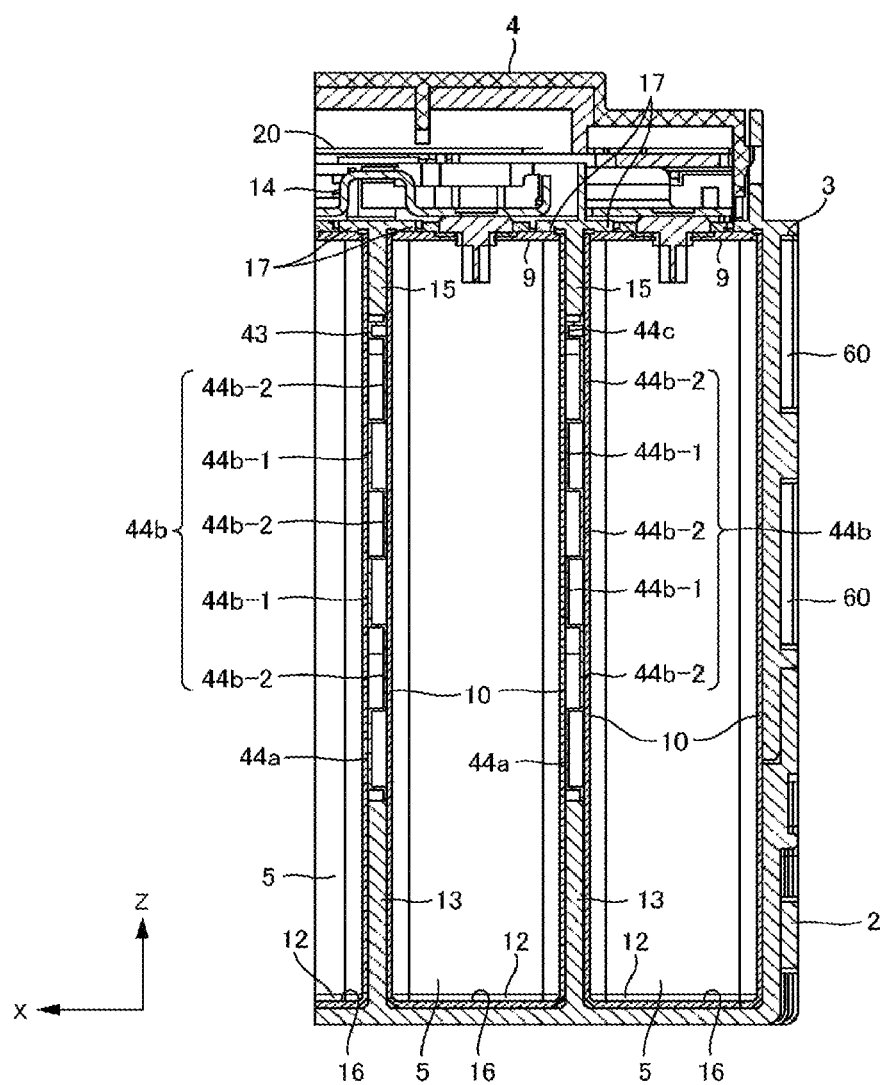
FIG. 15 is an enlarged cross-sectional view of a battery pack according to the third modification.

FIG. 13 is a perspective view of a separator 44 according to the present modification. FIG. 14 is a cross-sectional view of the separator 44 according to the present modification. FIG. 15 is an enlarged cross-sectional view of the battery pack 1 including separators 44 along an XZ plane.

As illustrated in FIGS. 13 to 15, each separator 44 according to the present modification includes first stoppers 44a, a cooling passage 44b, and a second stopper 44c.

The first stoppers 44a are located at one Z-axial end of the separator 44 while the second stopper 44c is located at the other Z-axial end of the separator 44. The cooling passage 44b extends between the first stoppers 44a and the second stopper 44c.

The first stoppers 44a are in the form of protrusions having a substantially rectangular-parallelepiped shape and a substantially square U-shaped cross section. The X-axial width of each protrusion is substantially equal to the given interval (secondary battery interval) between the secondary batteries 5 in the X-axis direction. The first stoppers 44a are spaced apart from each other in a direction (Y-axis direction) orthogonal to the thickness (X-axis direction) of the separator 44.

Meanwhile, the second stopper 44c is in the form of a groove continuously extending in the Y-axis direction and having a substantially square U-shaped cross section. The width of the groove is substantially equal to the given interval (secondary battery interval) between the secondary batteries 5 in the X-axis direction. The second stopper 44c extends in the direction (Y-axis direction) orthogonal to the thickness (X-axis direction) of the separator 44.

In the Z-axis direction, the first stoppers 44a are preferably longer in length than second stopper 44c.

The cooling passage 44b of each separator 44 according to the present modification has a continuous uneven structure including protrusions and recesses at given intervals, so as to contact with multiple points of the secondary batteries 5 located on both sides of the separator 44. The cooling passage 44b extends in the direction (Y-axis direction) orthogonal to the thickness (X-axis direction) of the separator 44.

In other words, the cooling passage 44b is provided with first protrusions 44b-1 and second protrusions 44b-2. The first protrusions 44b-1 protrude in the first direction from the center of the secondary battery interval to one of the two secondary batteries 5 adjacent to the cooling passage 44b, to abut against the secondary battery 5 and form a gap with the other of the two adjacent secondary batteries 5. The second protrusions 44b-2 protrude in the first direction from the center of the secondary battery interval to the other of the secondary batteries 5, to abut against the secondary battery 5 and form a gap with the one of the secondary batteries 5. The first protrusions 44b-1 and the second protrusions 44h-2 are alternately, repeatedly, and continuously disposed in a direction perpendicular to the cooling passage.

The first protrusions 44b-1 and the second protrusions 44b-2 each have surfaces abutting against the principal faces 10 of the secondary batteries 5. The surfaces have a given length in the Z-axis direction.

Owing to the separators 44, the battery pack 1 described above can insulate the adjacent secondary batteries 5 from each other and at the same time place the adjacent secondary batteries 5 with given spacing so that the coolant such as air can flow into the spacing.

By the separators 44, the coolant can be poured into the gap between the adjacent secondary batteries 5, defined by the first protrusions 44b-1 and the second protrusions 44b-2. Thus, the adjacent secondary batteries 5 can be cooled relatively evenly as compared with the coolant contacting only one of the secondary batteries 5. Consequently, the secondary batteries 5 are unlikely to be cooled at different degrees, enabling decrease in temperature difference between the secondary batteries 5.

Moreover, the X-axial width of the protrusions of the first stoppers 42a and the X-axial width of the groove of the second stopper 42c are substantially equal to the secondary battery interval between the secondary batteries 5. This can prevent the separator 44 from entering the gap between the secondary battery 5, and the first wall 13 and the second wall 15.

Furthermore, the first protrusions 44b-1 and the second protrusions 44b-2 of the cooling passage 44b have the surface of the given Z-axial length in contact with the principal faces 10 of the secondary batteries 5. Thus, the separator 44 can be easily fixed to the principal faces 10 of the adjacent secondary batteries 5. This can restrict the separator 44 from moving within the secondary battery interval.

The coolant is unlikely to flow in the part including the first stoppers 44a and the second stopper 44c. Thus, the coolant flows in the part provided with the cooling passage 44b. In the Z-axis direction the first stoppers 44a are longer in length than the second stopper 44c, so that the cooling passage 44b is located closer to the terminal faces 9 of the secondary batteries 5 generating a larger amount of heat. This allows a larger amount of coolant to flow in the part closer to the terminal faces 9. Consequently, the secondary batteries 5 can be more efficiently cooled.

Fourth Modification

Hereinafter, a fourth modification will be described. Descriptions of the same elements and effects as those of the embodiment will be omitted as appropriate.

Figure 16:
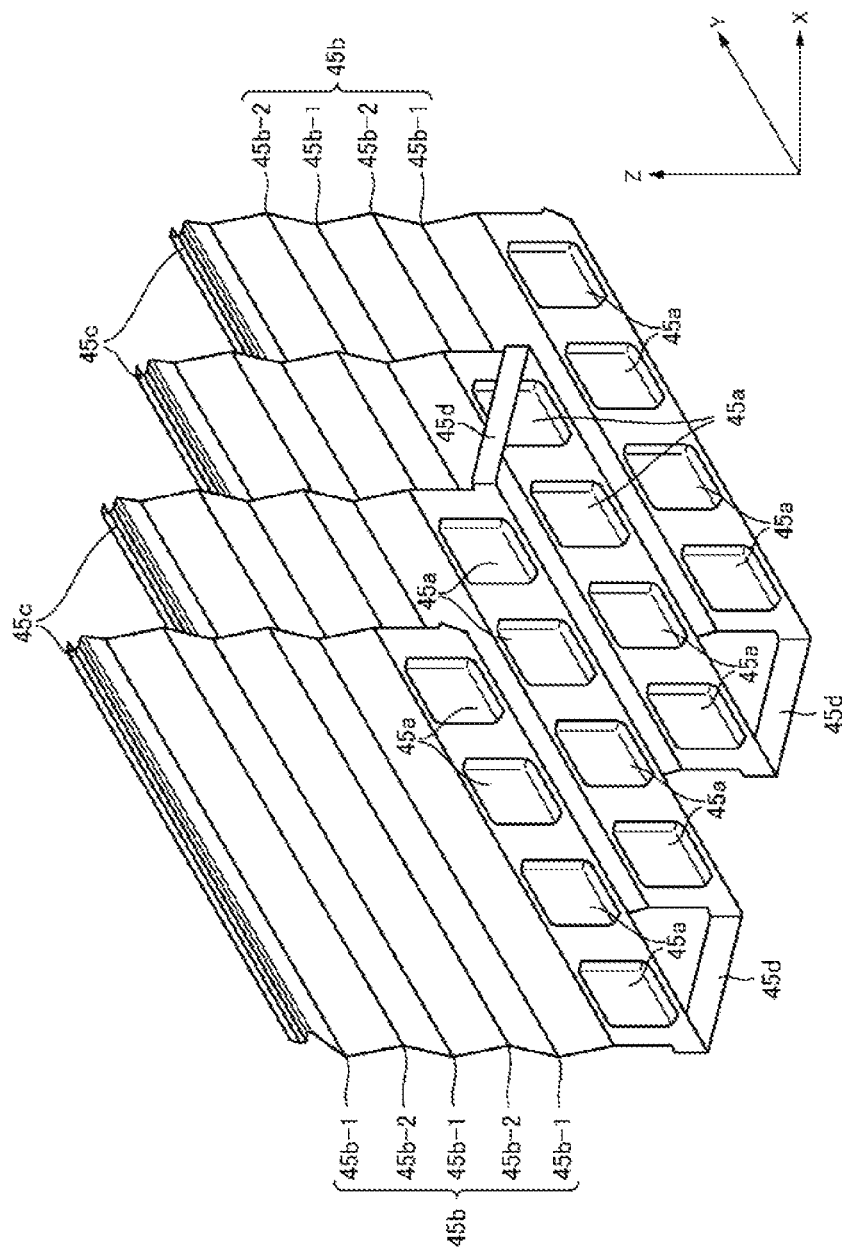
FIG. 16 is a perspective view of a separator according to a fourth modification.
Figure 17:
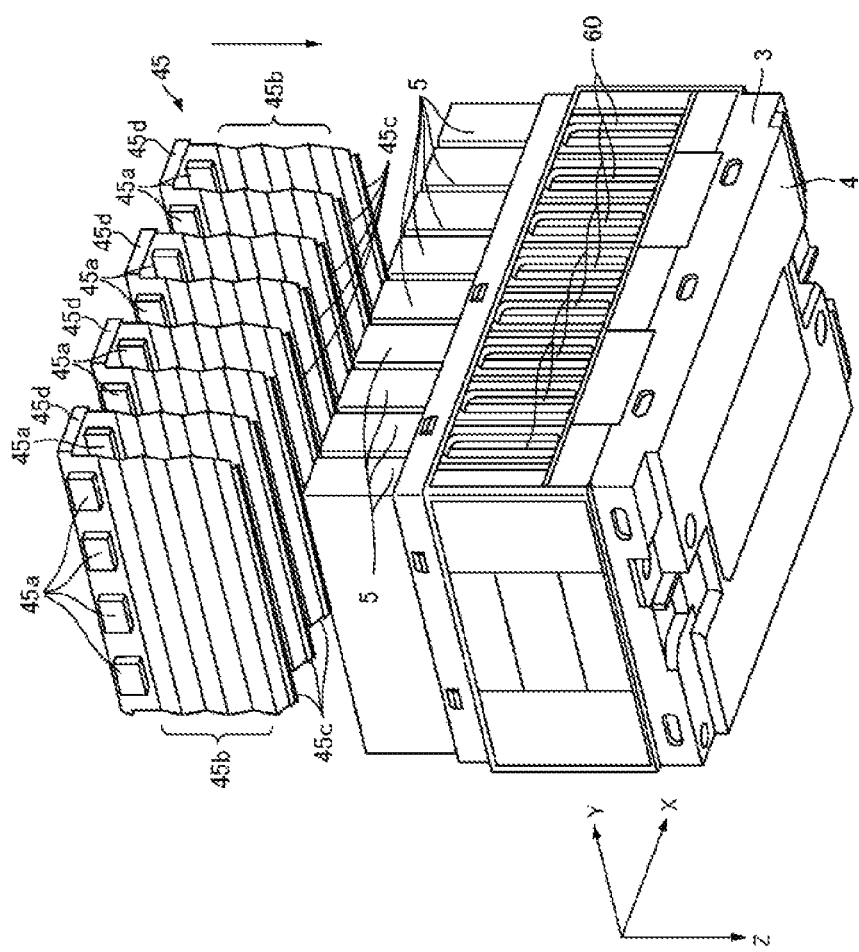
FIG. 17 is a perspective view of a battery pack according to the fourth modification.

FIG. 16 is a perspective view of a separator 45 according to the present modification. FIG. 17 is an exploded perspective view of the battery pack incorporating the separator 45, the secondary batteries 5, the upper case 3, and the lid 4 in a united manner.

As illustrated in FIGS. 16 and 17, the separator 45 according to the present modification includes the separators 41 of the embodiment coupled together through connections 45d. The separator 45 of the present modification includes first stoppers 45a, cooling passages 45b (45b-1, 45b-2), second stoppers 45c, and the connections 45d.

The separator 45 has the same structure as the separators 41 of the embodiment except for the connections 45d. Thus, overlapping descriptions of the separators 41 are omitted.

The connections 45d are made from the same material as the rest of the separator 45 and have, for example, a rectangular parallelepiped shape, and connect the first stoppers 45a together. The connections 45d extend in a direction (X direction) perpendicular to the surfaces (YZ planes) provided with the first stoppers 45a, the cooling passage 45b, and the second stopper 45c.

The coupling between the connections 45d and the first stoppers 45a have a bendable structure. The separator 45 are deformable to a zigzag form via the connections 45d, as illustrated in FIG. 17.

As illustrated in FIG. 17, the separator 45 is inserted into the secondary battery intervals between the secondary batteries 5 from the opening of the upper case 3 in which the secondary batteries 5 are set.

The separator 45 is inserted in the intervals from the second stoppers 45c, and the connections 45d are located on the opposite side of the separator 45. This can reduce a possibility of interference with the connections 45d at the time of inserting the separator 45 into the upper case 3. Further, the separator 45 has a structure including the separators in a united manner, so that the number of separators to insert is only one. This can decrease the number of insertion processes of the separator as compared with sequential insertion of the separators into the secondary battery intervals one by one.

The present modification has described the example of adding the connections 45d to the separators 41. However, the present modification is also applicable to separators of other shapes by adding the connections thereto.

Fifth Modification

Hereinafter, a fifth modification will be described. Descriptions of the same elements and effects as those of the embodiment will be omitted as appropriate.

Figure 18:
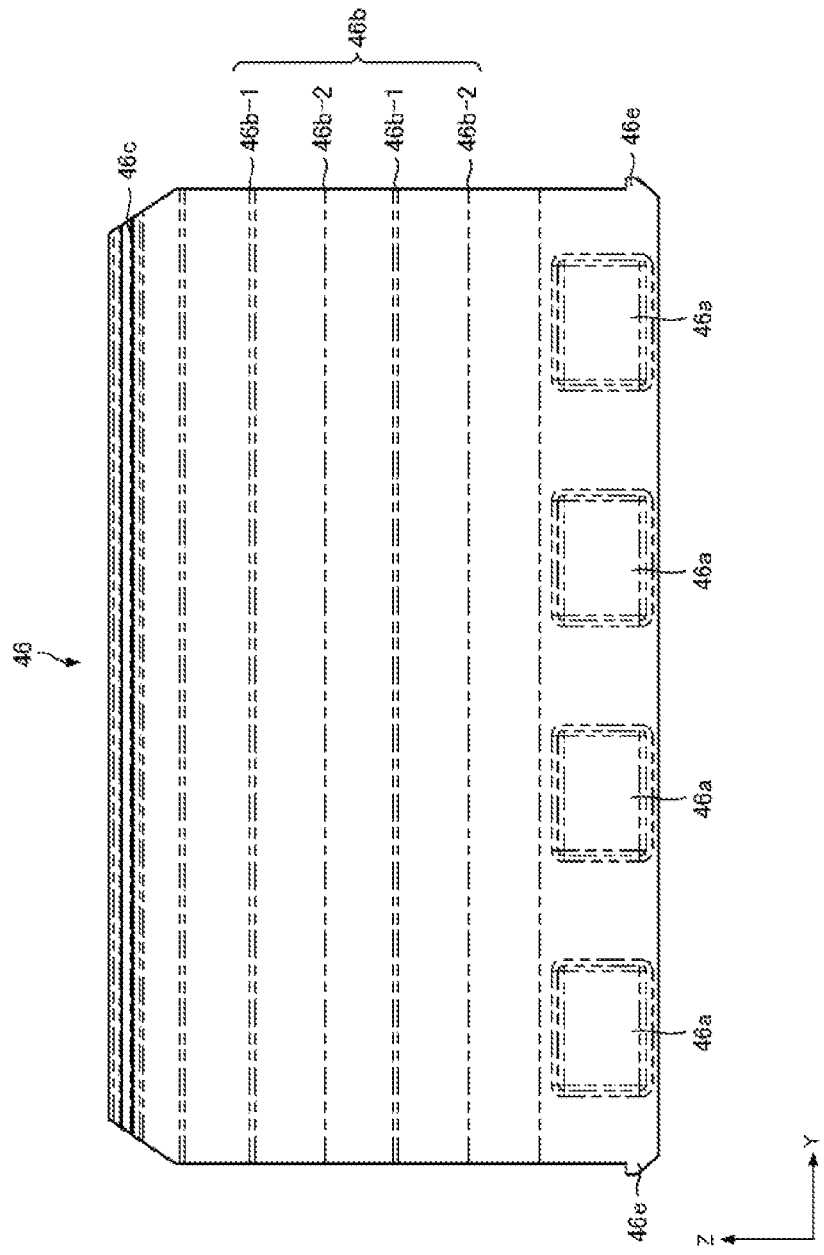
FIG. 18 is a side view of a separator according to a fifth modification.
Figure 19:
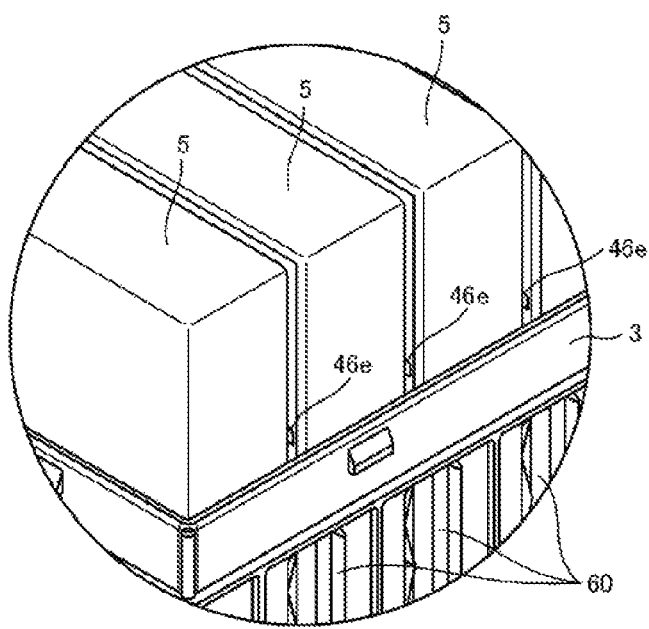
FIG. 19 is a partially enlarged view of a battery pack according to the fifth modification.

FIG. 18 is a side view of a separator 46 according to the present modification. FIG. 19 is a partially enlarged perspective view of the separator 46, the secondary batteries 5, and the upper case 3.

As illustrated in FIG. 18, the separator 46 includes first stoppers 46a, a cooling passage 46b (46b-1, 46-2), a second stopper 46c, and protrusions 46e of a tab form located at both Y-axial ends of the area where the first stoppers 46a are disposed. The separator 46 has the same structure as the separator 41 of the embodiment except for the tab-form protrusions 46e. Thus, overlapping descriptions of the separators 41 are omitted.

Specifically, the separator 46 including the tab-form protrusions 46e is longer in width than each secondary battery 5 in the Y-axis direction.

By such separators 46, the tab-form protrusions 46e of the separators 46 are not hidden by the secondary batteries 5 but appear in the vicinity of the lateral faces 11 of the secondary batteries 5, while inserted in the upper case 3, as illustrated in FIG. 19. This can prevent the manufacturer from forgetting to insert the separators during manufacture of the battery pack 1.

The present modification has described the example of adding the tab-form protrusions 46e to the separator 41. However, the present modification is also applicable to separators of other shapes by adding the tab-form protrusions thereto.

Sixth Modification

Hereinafter, a sixth modification will be described. Descriptions of the same elements and effects as those of the embodiment will be omitted as appropriate.

Figure 20:
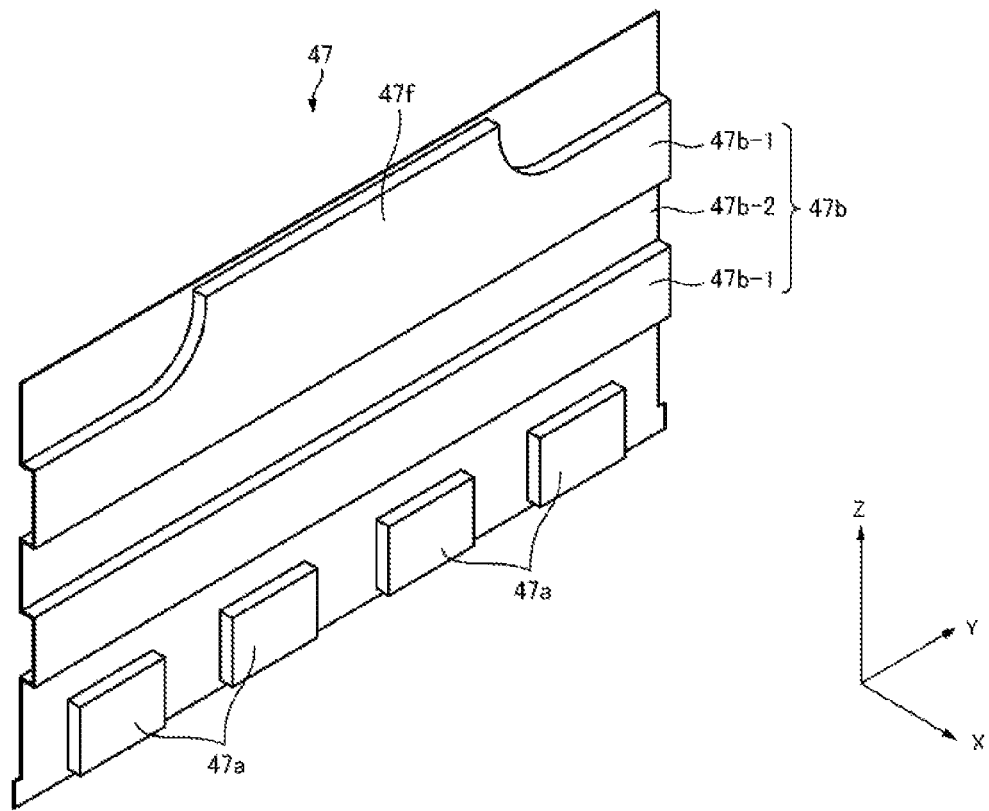
FIG. 20 is a perspective view of a separator according to a sixth modification.
Figure 21:
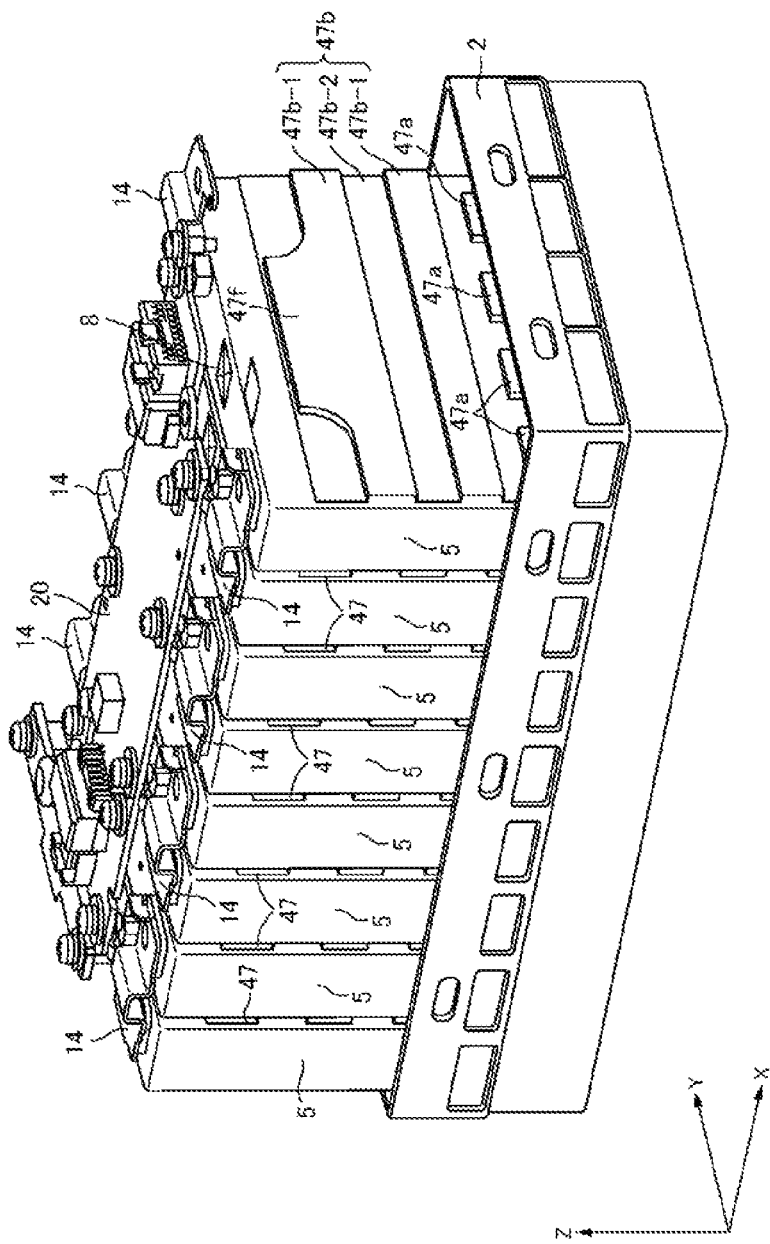
FIG. 21 is a partially exploded perspective view of a battery pack according to the sixth modification.

FIG. 20 is a perspective view of a separator 47 according to the present modification. FIG. 21 is a perspective view of the battery pack 1 including separators 47, the secondary batteries 5, the lower case 2, and the substrate 20.

As illustrated in FIG. 20, each separator 47 includes first stoppers 47a, a cooling passage 47b (47b-1, 47b-2), and a flow-direction changer 47f. The structure of the separator 47 excluding the flow-direction changer 47f is identical to that of the separator 44 of the third modification excluding the second stopper 44c. Thus, overlapping descriptions of the separator 44 are omitted.

In the Z-axis direction, the top of the separator 47 is opened upward to allow the coolant to flow upward in a given length from both Y-axial ends to the center.

Meanwhile, the separator 47 includes the flow-direction changer 47f in the central part in the Y-axis-direction. The flow-direction changer 47f protrudes in the first direction from the center of the secondary battery interval to the other secondary battery 5 to contact the other secondary battery 5.

The battery pack 1 includes such separators as illustrated in FIG. 21 (upper case 3 and other elements are omitted), so that the coolant flows from both lateral faces of the battery pack 1 to the terminal faces 9 of the secondary batteries and the substrate 20 along the shape of the flow-direction changers 47f.

A larger amount of coolant can flow in the terminal faces 9 of the secondary batteries and the substrate 20 which generate a larger amount of heat. Thereby, the cooling effect can be improved.

The present modification has described the example of applying the flow-direction changer 47f to the shape of the separator 44. However, the flow-direction changer 47f is also applicable to separators of a different shape.

Seventh Modification

Hereinafter, a seventh modification will be described. Descriptions of the same elements and effects as those of the embodiment will be omitted as appropriate.

Figure 22:
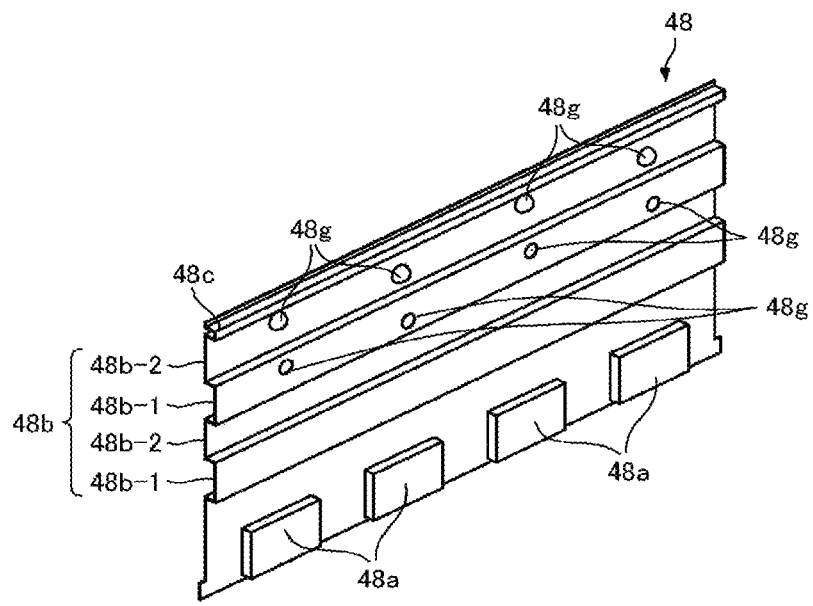
FIG. 22 is a perspective view of a separator according to a seventh modification.
Figure 23:
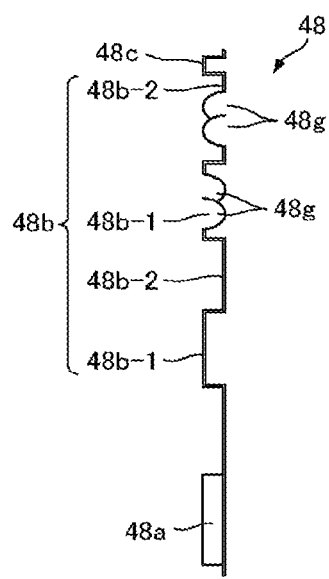
FIG. 23 is a cross-sectional view of the separator according to the seventh modification.

FIG. 22 is a perspective view of a separator 48 according to the present modification. FIG. 23 is a cross-sectional view of the separator 48.

As illustrated in FIGS. 22 and 23, the separator 48 includes first stoppers 48a, a cooling passage 48b (48b-1, 48b-2), a second stopper 48c, and protuberances 48g located on the cooling passage 48b. The separator 48 has the same structure as the separator 44 of the third modification except for the protuberances 48g. Thus, overlapping descriptions of the separators 44 are omitted.

The separator 48 is provided with the protuberances 48g on the cooling passage 48b. The surface of the cooling passage 48b where the protuberances 48g are located has convexities, and the opposite surface has concaves in the Y-axis direction. The protuberances 48g are preferably not identical to one another in the Z-axis direction, and are preferably made of the same material as the separator 48.

In the battery pack 1 including the separators 48 with such protuberances 48g, the coolant becomes a turbulent flow in the vicinity of the protuberances 48g, flowing into the cooling passages 48b. Such turbulent effect can improve heat conductivity and heat exchanging performance between the secondary batteries 5 and the fluid.

The present modification has described the example of applying the protuberances 48g to the shape of the separators 44. However, the protuberances 48g is also applicable to separators of other shapes.

Eighth Modification

Hereinafter, an eighth modification will be described. Descriptions of the same elements and effects as those of the embodiment will be omitted as appropriate.

Figure 24:
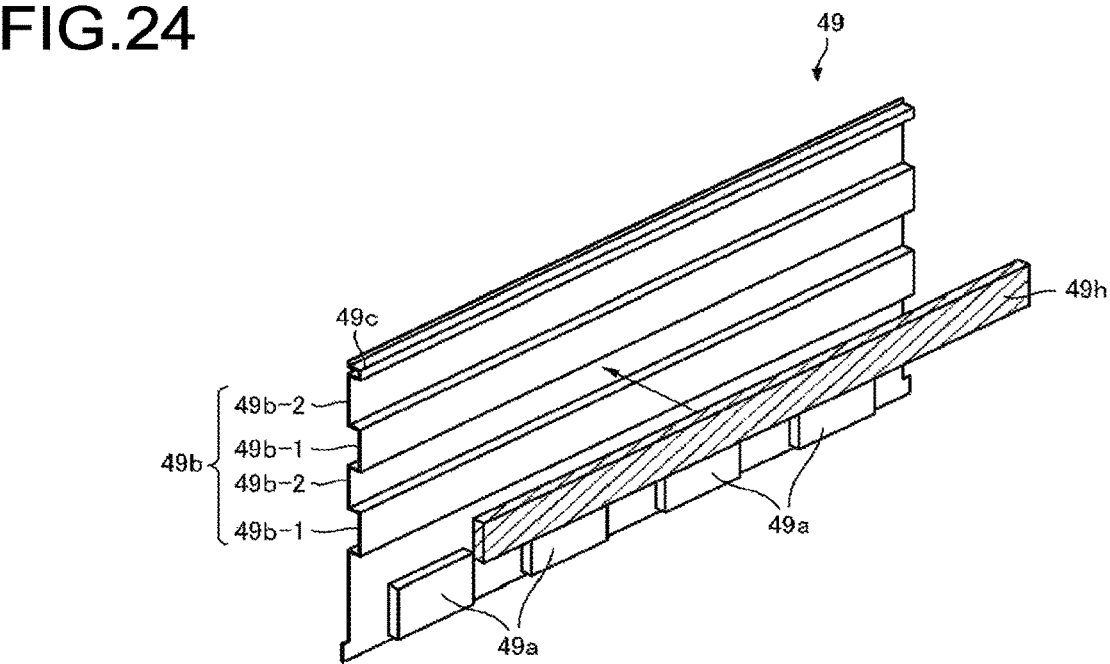
FIG. 24 is an exploded perspective view of a separator according to an eighth modification.
Figure 25:
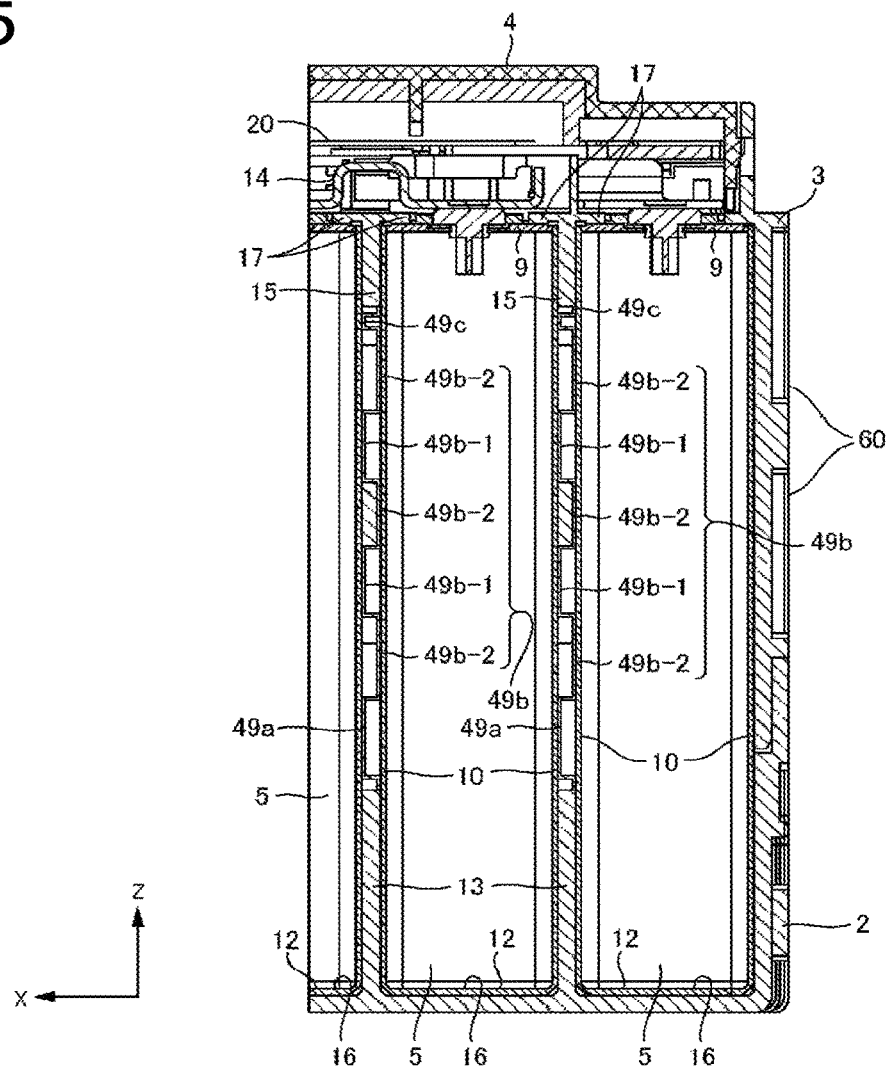
FIG. 25 is a cross-sectional view of a battery pack according to the eighth modification.

FIG. 24 is a perspective view of a separator 49 according to the present modification. FIG. 25 is a partially enlarged cross-sectional view of the battery pack 1 including separators 49 of the present modification.

As illustrated in FIGS. 24 and 25, each separator 49 incudes first stoppers 49a, a cooling passage 49b (49b-1, 49b-2), a second stopper 49c, and a rigid member 49h to be fitted into the cooling passage 49b. The separator 49 has the same structure as the separator 44 of the third modification except for the rigid member 49h. Thus, overlapping descriptions of the separators 44 are omitted.

The rigid member 49h has rigidity sufficient to tolerate swelling of the secondary batteries 5. The rigid member 49h is disposed in the part corresponding to a part of the secondary batteries 5, the part to exhibit relatively great swelling. Thus, the rigid member 49h abuts against both the adjacent secondary batteries 5, if swollen, to maintain the given interval between the secondary batteries 5. This can restrict the secondary batteries 5 from swelling, and decrease the possibility that the separator 49 is crushed by the adjacent secondary batteries 5.

The rigid member 49h is preferably fitted into the area in the vicinity of the center of the secondary battery 5 in the Z-axis direction. The secondary battery 5 typically swells most greatly in the central part. The separator 44 is provided with the rigid member 49h to be in contact with the central part, thereby exerting larger effects.

The present modification has described the example of applying the rigid member 49h to the shape of the separator 44. However, the rigid member 49h is also applicable to separators of other shapes.

Ninth Modification

Hereinafter, a ninth modification will be described. Descriptions of the same elements and effects as those of the embodiment will be omitted as appropriate.

Figure 26:
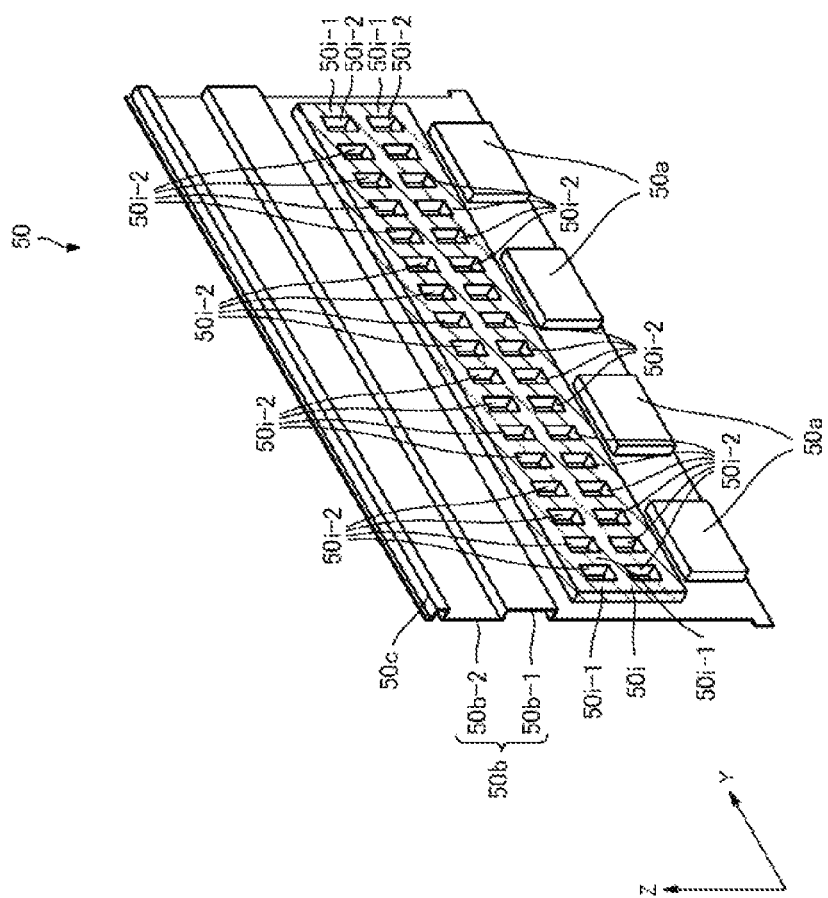
FIG. 26 is a perspective view of a separator according to a ninth modification.

FIG. 26 is a perspective view of a separator 50 according to the present modification.

As illustrated in FIG. 26, the separator 50 includes first stoppers 50a, a cooling passage 50b 50b-2), a second stopper 50c, and continuous protrusions and recesses 50i located between the first stoppers 50a and the cooling passage 50b. The separator 50 has the same structure as the separator 44 of the third modification except for the continuous protrusions and recesses 50i. Thus, overlapping descriptions of the separators 44 are omitted.

The continuous protrusions and recesses 50i extend in the Y-axis direction. Protrusions 50i-1 having substantially the same height as the secondary battery interval are continuous in the Y-axis direction while recesses 50i-2 having a given depth are continuous in the Y-axis direction. Thus, the protrusions 50i-1 of the continuous protrusions and recesses 50i abut against the principal faces 10 of the secondary batteries 5.

It is preferable that the separator 50 be provided with the continuous protrusions and recesses 50i corresponding to the central part of the secondary battery 5 in the Z-axis direction.

The continuous protrusions and recesses 50i function as a framework of the separator to improve the strength of the separator. Moreover, the protrusions 50i-1 abut against the principal faces 10 of the secondary batteries 5. Thus, if the adjacent secondary batteries 5 both swell, the protrusions 50i-1 work to abut against the corresponding secondary batteries 5, preventing further swelling thereof.

The present modification has described the example of applying the continuous protrusions and recesses 50i to the shape of the separator 44. However, the continuous protrusions and recesses 50i are also applicable to separators of other shapes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A battery pack comprising:
   a plurality of secondary batteries each including
      a terminal face provided with a positive electrode terminal and a negative electrode terminal,
      a pair of principal faces extending from a pair of long sides of the terminal face in a direction substantially orthogonal to the terminal face,
      a pair of lateral faces extending between the principal faces, and
      a bottom face opposite to the terminal face:
   a casing including
      a lower case having an opened top and a lower face opposing the bottom face, and
      an upper case having an opened bottom, and an upper face opposing the terminal face, the casing that houses the secondary batteries in a row in a first direction with a given secondary battery interval such that the principal faces oppose each other; and
   a plurality of separators placed between the corresponding secondary batteries, wherein
   the lower case includes a plurality of first walls erected upward from the lower face to a given height to partition the corresponding secondary batteries,
   the upper case includes a plurality of second walls erected downward from the upper face to a given height to partition the corresponding secondary batteries,
   the separators are disposed between the first walls and the second walls,
   the separators each include a first stopper provided at an end of the corresponding separator opposing the corresponding first wall, a second stopper provided at an end of the corresponding separator opposing the corresponding second wall, and a cooling passage between the secondary batteries and between the first stopper and the second stopper, the first stopper having a thickness in the first direction substantially equal to the secondary battery interval, the second stopper having a thickness in the first direction substantially equal to the secondary battery interval, and
   the casing has a face opposing the lateral faces and provided with an opening opposing the cooling passage.

2. The battery pack according to claim 1, wherein the cooling passage includes:
   a plurality of first protrusions that protrudes in the first direction from a center of the secondary battery interval to one of the two secondary batteries adjacent to the cooling passage, to abut against the one of the secondary batteries and form a gap with the other of the two adjacent secondary batteries, and
   a plurality of second protrusions that protrudes in the first direction from the center of the secondary battery interval to the other of the secondary batteries, to abut against the other of the secondary batteries and form a gap with the one of the secondary batteries, the first protrusions and the second protrusions being alternately, repeatedly, and continuously disposed in a direction perpendicular to the cooling passage.

3. The battery pack according to claim 2, wherein the first protrusions and the second protrusions have a continuous zigzag form.

4. The battery pack according to claim 2, wherein the first protrusions and the second protrusions have a continuous waveform.

5. The battery pack according to claim 1, Wherein the cooling passage is formed on both sides of a flat surface in a center of the secondary battery interval in the first direction.

6. The battery pack according to claim 1, wherein the first stopper is greater in vertical dimension than the second stopper.

7. The battery pack according to claim 1, wherein the second stopper has a grooved shape.

8. The battery pack according to claim 7, wherein the grooved shape has a substantially square U-shaped cross section.

* * * * *